(12) United States Patent
Tozzola et al.

(10) Patent No.: US 6,201,101 B1
(45) Date of Patent: Mar. 13, 2001

(54) CATALYST AND ITS USE FOR THE SYNTHESIS OF POLYOL POLYETHERS

(75) Inventors: Gabriella Tozzola, Rovellasca; Riccardo Po', Livorno; Nicoletta Cardi, Arona, all of (IT)

(73) Assignee: Enichem S.p.A., San Donato Milanese (IT)

( * ) Notice: Subject to any disclaimer, the term of this patent is extended or adjusted under 35 U.S.C. 154(b) by 0 days.

(21) Appl. No.: 09/438,372

(22) Filed: Nov. 12, 1999

(30) Foreign Application Priority Data

Nov. 19, 1998 (IT) .............................. MI98A2497

(51) Int. Cl.$^7$ .............................. C08G 59/06; C08J 3/205
(52) U.S. Cl. .................... 528/485; 528/488; 528/495; 502/104
(58) Field of Search ............................ 502/104; 528/485, 528/488, 495

(56) References Cited

U.S. PATENT DOCUMENTS 5,210,323 * 5/1993 Wimmer et al. ...................... 568/615

FOREIGN PATENT DOCUMENTS 0 516 017   12/1992 (EP) .
0 578 584   1/1994 (EP) .

OTHER PUBLICATIONS

Derwent Abstract, AN 85–143999, JP 60 078637, May 4, 1985.
Chemical Abstract, vol. 67, No. 10, Sep. 4, 1967, Abstract No. 49996b, p. 4676.
Chemical Abstract, vol. 84, No. 18, May 3, 1976, Abstract No. 129797d, p. 572.
Derwent Abstract, AN 77–01469Y, SU 512 172, Jun. 15, 1976.
Derwent Abstract, AN 71–08863S, JP 46 003456.

* cited by examiner

*Primary Examiner*—Duc Truong
(74) *Attorney, Agent, or Firm*—Oblon, Spivak, McClelland, Maier & Neustadt, P.C.

(57) ABSTRACT

The present invention relates to a catalyst having general formula (I):

$$M[SbO_n(OH)_{2(3-n)}]_x \qquad (I)$$

wherein: M represents at least one cation of an element selected from earth-alkaline metals belonging to groups IIA, IIIA, VA, or transition metals belonging to groups IIB, IIIB, VB or VIIIB; n represents an integer between 0 and 2 and x is an integer between 2 and 5.

The invention also relates to a process for the synthesis of polyol polyethers which uses a catalyst having general formula (I).

21 Claims, No Drawings

CATALYST AND ITS USE FOR THE SYNTHESIS OF POLYOL POLYETHERS

The present invention relates to a catalyst having general formula (I) and a process for the synthesis of polyol polyethers which uses this catalyst.

Polyol polyethers are very versatile compounds which can be used as such or as intermediates in the production of compounds of industrial interest such as polyurethanes, detergents or additives for oils.

Polyol polyethers are usually prepared by reacting an alkylene oxide, especially propylene oxide, ethylene oxide or their mixtures, with a compound having active hydrogen atoms (initiator) in the presence of an acid, metal or basic alkoxylation catalyst.

Acidic catalysts, typically Lewis acids such as aluminum trichloride, boron trifluoride, tin tetrachloride, zinc chloride, cause a high formation of low-boiling cyclic oligomers (Meerwein et al., 1939, J. Prakt. Chem., 154, 83). The use of cocatalysts such as water, alcohols or alkyl halides leads to an improvement in the conversion to polymer, but in such a quantity that these systems cannot be used on an industrial scale (Merral et al., 1960, Can. J. Chem. 82).

Metallic catalysts, based on metals such as iron, zinc or aluminum, have a good catalytic activity.

Examples of metal catalysts are iron chloride (U.S. Pat. No. 2,706,181), optionally activated with water, zinc or aluminum alcoholates (Osgan et al., 1959, J. Polym. Sci. 34, 153), mixtures of aluminum alcoholates with zinc chloride (Miller et al., 1960, J. Polym. Sci. 46, 455), the Vandenberg catalyst, consisting of an aluminoxane complexed with acetylacetone (Vandenberg, 1976, Pure Appl. Chem., 48, 295).

These catalysts act with a coordination mechanism and produce materials generally consisting of two distinct fractions: an amorphous polyether with a relatively low molecular weight and a polyether with a high molecular weight, stereoregular and crystalline.

As a liquid polyol is required for the synthesis of polyurethanes, and therefore not stereoregular and with a moderate molecular weight (normally less than 10,000), these catalysts are not deemed suitable, even though with these systems one of the end groups of the polyols is a halogen or an alkyl group, which is not polymerizable in reactions with isocyanates (F. E. Bailey, J. V. Kolesske, "Alkylene oxides and their polymers", Marcel Dekker Inc. (1991, chapter 4).

Basic catalysts, in particular potassium hydroxide, are used in industrial processes for the preparation of polyol polyethers which can be used as intermediates for the preparation of polyurethanes. These catalysts however, have a moderate catalytic activity and consequently relatively long reaction times are required for obtaining complete conversion of the propylene oxide.

A further disadvantage relates to the formation of unsaturated end groups, due to secondary reactions caused by the alkalinity of the medium.

Another group of catalysts proposed in patent literature is that of metal cyanometallates, particularly zinc hexacyanoferrate and zinc hexacyanocobaltate, as such (U.S. Pat. No. 4,4725,60) or modified (EP-743.093).

These catalysts produce liquid, amorphous polyol polyethers with a suitable molecular weight and with a low unsaturation degree. Their preparation however is extremely complex (Kuyper et al., 1987, J. Catal., 105, 163) and the experimental parameters adopted in their preparation (temperature, concentration of the solutions, order and rate of the products added) can substantially influence their catalytic activity. It has, in fact, been observed that in numerous cases even inert products are obtained. In addition, these catalysts have long and non-reproducible induction times causing problems relating to reaction control and safety of the plant.

It has now been found that it is possible to overcome the drawbacks of the known art mentioned above by means of a new group of catalysts based on metal antimoniates.

In particular the use of these catalysts has the following advantages: (i) good catalytic activity, no induction time, good selectivity and easy preparation.

In accordance with this the present invention relates to a group of catalysts having general formula (I)

$$M[SbO_n(OH)_{2(3-n)}]_x \qquad (I)$$

wherein: M represents at least one cation of an element selected from earth-alkaline metals belonging to groups IIA, IIIA, VA, or transition metals belonging to groups IIB, IIIB, VB or VIIIB; n represents an integer between 0 and 2 and x is an integer between 2 and 5.

M is preferably selected from magnesium, calcium, strontium, barium, aluminum, tin, titanium, cobalt, iron, zinc or combinations of these. Particularly preferred for the purposes of the present invention are zinc and aluminum or combinations of these.

The catalysts (I) of the present invention can be prepared with known techniques starting from a hydroxy-antimoniate of an alkaline metal and an organic or inorganic salt of a metallic cation M.

The synthesis of the catalysts having general formula (I) is typically carried out by putting the components in contact under light stirring, in an aqueous solution, at a temperature ranging from 25 to 100° C., preferably between 50° C. and 90° C., for a period of 0.1 to 3 hours.

The way in which the various components are put in contact with each other, is not critical; however in the preferred embodiment this is achieved by dissolving in water a soluble salt of hexahydroxyantimonic acid at a final weight concentration of 0.1 to 10%, and adding a salt of the metal (M) to the resulting solution, with a molar ratio M/Sb ranging from 10 to 1, preferably between 5 and 1.

The suspended solid is then separated by filtration. The compound thus obtained can be washed with an organic solvent to totally or partly remove the imbibition and/or crystallization water. At the end the catalyst is dried at temperatures ranging from 20° C. to 80° C. and for times of 1 to 24 hours.

The catalyst of the present invention is active in synthesis processes of polyol polyethers by the reaction of an alkylene oxide with one or more compounds, indicated with the term initiators, capable of promoting the formation of hydroxy-alcohol end groups.

The alkylene oxides are selected from epichlorohydrin, propylene oxide, ethylene oxide, butene oxide or their mixtures.

The quantity of oxide used in the process is selected in relation to the molecular weight desired for the polyol polyethers.

The initiators are water or polyfunctional alcohols with from 2 to 20 carbon atoms, in particular from 2 to 10 carbon atoms, or polyols with a molecular weight of less than 1,000 daltons.

Examples of initiators are: glycols such as for example, ethylene, propylene, butylene glycol; diols such as 1,3-propanediol, 1,4-butanediol, 1,6-hexane-diol, cyclohexanediol, cyclohexanedimethanol, benzenedimethanol; aromatic diols such as hydroquinone, methylhydroquinone, catechol, resorcinol, naphthalenediol, dihydroxybiphenyl; aliphatic polyfunctional alcohols such as glycerine, pentaerythritol, trimethylolpropane or aromatics such as for example pyrogallic acid; sugar derivatives (pentose or hexose) such as sorbitol, mannitol, glucitol, xylitol, adonitol, etc.

Alternatively, it is also possible to use polyfunctional acids such as succinic, glutaric, malonic, adipic acid or hydroxyacids such as hydroxyacetic, hydroxypropionic, hydroxybutanoic, hydroxyhexanoic, hydroxybenzoic, citric, tartaric acid. Finally polyfunctional amines can also be used, such as ethylenediamine, tetramethylenediamine, hexamethylenediamine, isophoronediamine, benzenediamine, diaminobiphenyl, etc.

The selection of the appropriate initiator also depends on the polymer to be prepared.

For example, bifunctional initiators are particularly suitable for the preparation of polyol polyethers which can be used for the production of polyurethane elastomers.

The quantity of catalyst used can vary within wide limits, but generally ranges from 0.001 to 0.01 moles per mole of monomer.

The polymerization can be carried out without or in the presence of a hydrocarbon solvent such as, for example, toluene, benzene, xylene, ethylbenzene, cumene or an ether solvent such as ethylic, propylic, isopropylic, butylic ether, tetrahydrofuran, pyrane, dioxane, dimethoxyethane, dimethoxypropane, dimethoxybutane or diethoxyethane.

The temperatures used in the process of the present invention are generally within a range of values of 50° C. to 180° C., preferably from 80° C. to 120° C. The reaction is normally carried out in a closed system at a pressure which generally does not exceed 8 atms, preferably 6 atms.

According to another embodiment, the polymerization can be preceded by a treatment step of the catalyst with the initiator at temperatures ranging from 25° C. to 120° C. and for times ranging from 0.5 to 30 hours.

When the polymerization is complete, the catalyst can be removed from the product by means of the conventional techniques such as, for example, filtration.

The process of the present invention can be carried out batchwise or in continuous.

The polyols obtained with the process of the present invention were characterized by means of nuclear magnetic resonance spectroscopy to determine the degree of stereoregularity and by differential scanning calorimetry to identify the melting point. The products proved to be liquid and therefore with no melting point. NMR analysis showed that the products are not stereoregular (atactic).

The following examples provide a better illustration of the present invention but in no way limit the scope of the invention itself.

EXAMPLE 1

Synthesis of catalyst A 4.21 g of $KSb(OH)_6$ (16 mmoles) are dissolved in a 1 liter glass beaker containing 400 ml of distilled water, at 75° C.

A second solution is parallelly prepared by dissolving 11.9 g of $Zn(NO_3)_2.6H_2O$ (40 mmoles) in 30 ml of distilled water at 75° C. This solution is then added to the first under vigorous stirring, and the temperature is maintained at 75° C. for 20 minutes. The solution is subsequently slowly brought to 20–25° C. (in about 1 hour), under constant stirring and is kept at this temperature for about 24 hours.

The solid obtained is then filtered, washed twice with 30 ml of water and dried in an oven at 50° C. for 6 hours.

4.13 g of a powdery white solid are obtained (catalyst A) which upon elemental analysis has the following results: Zn 12.7% and Sb 46.9%.

EXAMPLE 2

Synthesis of catalyst C 3.95 g of $KSb(OH)_6$ (15 mmoles) are dissolved at 80° C. in 500 ml of distilled water.

A solution of 7.6 g of $Al(NO_3)_3.9H_2O$ (20 mmoles) in 25 ml of distilled water at 70° C., is parellelly prepared. This solution is then added to the first under vigorous stirring, and the temperature is maintained at 80° C. for 20 minutes. The solution is subsequently slowly brought to 20–25° C. (in about 1 hour), under constant stirring and is kept at this temperature for about 24 hours.

The solid obtained is then filtered, washed with 30 ml of water and suspended in 20 ml of dioxane. After filtration, the solid is washed again with dioxane and after filtration, is dried at room temperature for 8 hours, at 1 atm.

3.31 g of a powdery white solid are obtained (catalyst C) which upon elemental analysis has the following results: Al 3.95% and Sb 48.7%.

EXAMPLE 3

Synthesis of catalyst D 4.21 g of $KSb(OH)_6$ (15 mmoles) are dissolved at 80° C. in 500 ml of distilled water.

Parallelly, 9.96 g of $Co(OOCCH_3)_2.4H_2O$ (40 mmoles) are dissolved in 10 ml of distilled water and 10 ml of concentrated HCl at room temperature.

The mixture is evaporated until it becomes dry and 20 ml of water are added; this procedure is repeated twice until the vapours released from the solution are neutral.

This solution is then added to the first under vigorous stirring, and the temperature is maintained at 80° C. for 20 minutes. The solution is subsequently slowly brought to 20–25° C. (in about 1 hour), under constant stirring and is kept at this temperature for about 24 hours.

The solid obtained is filtered, washed with water (30 ml) and suspended twice in 20 ml of dioxane. After filtration, the solid is washed again with dioxane and after filtration, is dried in an oven at 50° C. for 6 hours.

5.68 g of a powdery pink solid are obtained (catalyst D) which upon elemental analysis has the following results: Co 10.96% and Sb 46.08%.

EXAMPLE 4

Synthesis of catalyst E 3.95 g of $KSb(OH)_6$ (15 mmoles) are dissolved at 70° C. in 350 ml of distilled water.

A solution of 2.68 g of $Zn(NO_3)_2.6H_2O$ (9 mmoles) and 0.38 g of $Al(NO_3)_2.9H_2O$ (1 mmole) in 10 ml of distilled water at 70° C., is parellelly prepared.

This solution is then added to the first under vigorous stirring, and the temperature is maintained at 70° C. for 15 minutes. The solution is subsequently slowly brought to 20–25° C. (in about 1 hour), under constant stirring and is kept at this temperature for about 24 hours.

The solid obtained is filtered and washed with water (30 ml twice). After filtration, the solid is filtered and then dried at 50° C. for 6 hours.

4.00 g of a powdery white solid are obtained (catalyst E) which upon elemental analysis has the following results: Al 0.663%, Zn 28.04% and Sb 47.6%.

EXAMPLE 5

0.06 g of catalyst A and 1.0 g of ethylene glycol are charged into a 25 ml reactor, equipped with magnetic stirring devices and a heat exchanger (oil bath). The water present is then removed by reducing the pressure to 0.001 atms for 30 minutes. The pressure is then reestablished by the introduction of nitrogen and the mixture is heated in an inert atmosphere to 100° C. for 1 hour, under magnetic stirring. The reactor is brought to a temperature of 25° C., 10 ml of propylene-oxide (PO) are added in a nitrogen atmosphere and the mixture is heated to 100° C. for 2 hours.

The non-reacted PO is removed from the reaction mixture under conditions of reduced pressure.

3.72 g of polyol are obtained, corresponding to a conversion of 33%.

The polyol thus obtained is diluted with 100 ml of acetone, filtered on an alumina bed to separate the catalyst and then subjected to a pressure of 0.001 atms to evaporate the solvent.

EXAMPLE 6

The reaction is carried out under the same conditions described in example 5, but using 0.39 g of propylene glycol. 0.9 g of polyol are obtained, corresponding to a conversion of 6%.

EXAMPLE 7

The reaction is carried out under the same conditions as example 6, but using a reaction time of 3 hours. 1.7 g of polyol are obtained, corresponding to a conversion of 16%.

EXAMPLE 8

The same procedure is adopted as described in example 5, but carrying out the reaction at 80° C. 2.3 g of polyol are obtained, corresponding to a conversion of 16%.

EXAMPLE 9

The reaction is carried out under the same conditions as example 5, but using 0.20 g of catalyst C. 6.10 g of polyol are obtained, corresponding to a conversion of 63%.

EXAMPLE 10

The reaction is carried out under the same conditions as example 5, but using 0.06 g of catalyst D and a reaction time of 5 hours. 1.91 g of polyol are obtained, corresponding to a conversion of 11%.

EXAMPLE 11

The reaction is carried out under the same conditions as example 5, but using 0.08 g of catalyst E. 4.36 g of polyol are obtained, corresponding to a conversion of 40%.

EXAMPLE 12 (comparative)

The same procedure is adopted as described in example 5, using 0.85 g of a solution at 1% by weight of KOH in ethylene glycol. 2.4 g of polyol are obtained, corresponding to a conversion of PO of 19%. The KOH present in the reaction mixture is neutralized by adding 0.18 g of NaHCO$_3$.

EXAMPLE 13 (comparative)

The same procedure is adopted as described in example 5, using 0.41 g of a solution at 2.2% by weight of KOH in ethylene glycol. 1.0 g of polyol are obtained, corresponding to a conversion of PO of 8%. The KOH present in the reaction mixture is neutralized by adding 0.18 g of NaHCO$_3$.

EXAMPLE 14 (comparative)

The same procedure is adopted as described in example 5, but using 0.22 g of potassium antimoniate (KSb(OH)$_6$). There is no polymerization.

EXAMPLE 15 (comparative)

1.06 ml of a 1.57 M solution of methylaluminoxane in toluene and 4 ml of hexene oxide were charged in an inert atmosphere into a test-tube. The reaction mixture was put under stirring for 5 hours at 100° C.

3.5 g of a transparent, light-yellow product with a semi-solid consistency, were obtained. The product was suspended in a solution consisting of 60 ml of methylethylketone and 1 ml of concentrated HCl. The mixture was cooled to 0° C., filtered and the solid obtained was dried under vacuum. It proved to be equal to 1.93 g, corresponding to a conversion of the monomer to solid product of 58%.

The use of aluminoxanes generates partially solid products which are not suitable for use as intermediates for polyurethanes.

EXAMPLE 16 (comparative)

89 mg of iron chloride hexahydrate, 1.66 ml of a 1 M solution of triisobutylaluminum in toluene and 4 ml of hexene oxide were charged in an inert atmosphere into a test-tube. The reaction mixture was put under stirring for 5 hours at 100° C.

3.6 g of a brown product with a semi-solid consistency, were obtained. The product was suspended in a solution consisting of 60 ml of acetone, 60 ml of methylethylketone and 1 ml of concentrated HCl. The mixture was cooled to 0° C., filtered and the solid obtained was dried under vacuum. It proved to be equal to 2.19 g, corresponding to a conversion of the monomer to solid product of 66%. The use of aluminoalkyl and iron chloride generates partially solid products which are not suitable for use as intermediates for polyurethanes.

What is claimed is:

1. A catalyst which can be used for the synthesis of polyol polyethers having general formula (I):

$$M[SbO_n(OH)_{2(3-n)}]_x \qquad (I)$$

wherein: M represents at least one cation of an element selected from earth-alkaline metals belonging to groups IIA, IIIA, VA, or transition metals belonging to groups IIB, IIIB, VB or VIIIB; n represents an integer between 0 and 2 and x is an integer between 2 and 5.

2. The catalyst according to claim 1, wherein M is selected from magnesium, calcium, stronzium, barium, aluminum, tin, titanium, vanadium, cobalt, iron and zinc or combinations of these.

3. The catalyst according to claim 2, wherein M is zinc, aluminum or combinations of these.

4. A process for the preparation of polyol polyethers by the reaction of an alkylene oxide with one or more compounds capable of promoting the formation of hydroxyalcohol end groups, in the presence of a catalyst, wherein said process is characterized in that the catalyst is represented by formula (I):

$$M[SbO_n(OH)_{2(3-n)}]_x \qquad (I)$$

wherein: M represents at least one cation of an element selected from earth-alkaline metals belonging to groups IIA, IIIA, VA, or transition metals belonging to groups IIB, IIIB, VB or VIIIB; n represents an integer between 0 and 2 and x is an integer between 2 and 5.

5. The process according to claim 4, wherein the alkylene oxide is selected from epichlorohydrin, propylene oxide, ethylene oxide, butene oxide or their mixtures.

6. The process according to claim 4, wherein the compound capable of promoting the formation of hydroxyalcohol end groups, is selected from water, polyfunctional alcohols with from 2 to 20 carbon atoms, or polyols with a molecular weight of less than 1,000 daltons.

7. The process according to claim 6, wherein the polyfunctional alcohols have from 2 to 10 carbon atoms.

8. The process according to claim 6, wherein the compounds are selected from glycols, diols, aromatic diols, aliphatic or aromatic polyfunctional alcohols, pentose or hexose sugar derivatives, polyfunctional acids, hydroxyacids, polyfunctional amines.

9. The process according to claim 8, wherein the glycols are selected from ethylene, propylene and butylene glycol.

10. The process according to claim 8, wherein the diols are selected from 1,3-propanediol, 1,4-butanediol, 1,6-hexanediol, cyclohexanediol, cyclohexanedimethanol, benzenedimethanol, hydroquinone, methylhydroquinone, catechol, resorcinol, naphthalenediol, dihydroxybiphenyl.

11. The process according to claim 8, wherein the alcohols are selected from glycerine, pentaerythritol, trimethylolpropane or pyrogallic acid.

12. The process according to claim 8, wherein the sugars are selected from sorbitol, mannitol, glucitol, xylitol, adonitol.

13. The process according to claim 8, wherein the acids are selected from succinic, glutaric, malonic, adipic, hydroxyacetic, hydroxypropionic, hydroxybutanoic, hydroxyhexanoic, hydroxybenzoic, citric, tartaric acid.

14. The process according to claim 8, wherein the polyfunctional amines are selected from ethylenediamine, tetramethylenediamine, hexamethylenediamine, isophoronediamine, benzenediamine, diaminobiphenyl.

15. The process according to claim 4, wherein the quantity of catalyst is between 0.001 and 0.01 moles per mole of alkylene oxide.

16. The process according to claim 4, wherein the reaction is carried out at a temperature ranging from 50° C. to 180° C.

17. The process according to claim 16, wherein the temperature is between 80° C. and 120° C.

18. The process according to claim 4, wherein the reaction is carried out at a pressure which does not exceed 8 atmospheres.

19. The process according to claim 18, wherein the reaction is carried out at a pressure which does not exceed 6 atmospheres.

20. The process according to claim 4, wherein the metal cation of the catalyst (I) is Zn, Al or combinations of these.

21. The process according to claim 4, wherein the polymerization is preceded by a step in which the catalyst is treated with the initiator at temperatures ranging from 25° C. to 120° C. and for times ranging from 0.5 to 30 hours.

* * * * *